US00RE39360E

(19) United States
(12) Reissued Patent
Aziz et al.

(10) Patent Number: US RE39,360 E
(45) Date of Reissued Patent: Oct. 17, 2006

(54) SYSTEM FOR SIGNATURELESS TRANSMISSION AND RECEPTION OF DATA PACKETS BETWEEN COMPUTER NETWORKS

(75) Inventors: Ashar Aziz, Fremont, CA (US); Geoffrey Mulligan, Fremont, CA (US); Martin Patterson, Grenoble (FR); Glenn Scott, Sunnyvale, CA (US)

(73) Assignee: Sun Microsystems, Inc., Santa Clara, CA (US)

(21) Appl. No.: 09/136,954

(22) Filed: Aug. 19, 1998

Related U.S. Patent Documents

Reissue of:
(64) Patent No.: 5,548,646
Issued: Aug. 20, 1996
Appl. No.: 08/306,337
Filed: Sep. 15, 1994

(51) Int. Cl.
*H04L 9/00* (2006.01)

(52) U.S. Cl. ..... 713/150; 380/21; 380/49; 380/277; 713/151; 713/153; 713/154; 713/160; 713/162

(58) Field of Classification Search ..... 380/49, 380/21, 277; 713/151, 153–154, 160–163, 713/150, 200–201; 709/200, 217
See application file for complete search history.

(56) References Cited

U.S. PATENT DOCUMENTS 5,161,192 A * 11/1992 Carter et al. ..... 380/49 X
5,204,961 A * 4/1993 Barlow ..... 380/25
5,303,303 A * 4/1994 White ..... 380/49
5,416,842 A * 5/1995 Aziz ..... 380/4
5,442,708 A * 8/1995 Adams, Jr. et al. ..... 380/49
5,444,782 A * 8/1995 Adams, Jr. et al. ..... 380/49

FOREIGN PATENT DOCUMENTS

JP 04-154233 5/1992
WO 92 02095 * 6/1992

OTHER PUBLICATIONS

Chuck Semeria, Understanding IP Addressing: Everything You Ever Wanted to Know. 1996. 3Com CorOporation.*
Forne et al., "Hardware Implementation of a Secure Bridge in Ethernet Environments," Nov. 29, 1993, IEEE.
O'Higgins, et al, "Securing Information in X.25 Networks," Dec. 2–5, 1990, Globecom '90 IEEE Global Telecommunications Conference & Exhibition.
Sharp et al., "Network Security in a Heterogeneous Environment," Sep. 1994, AT&T Technical Journal.
Yamaguchi et al., "A design for LAN cipher communications," Jan. 21, 1994, Technical Report of IEICE, vol. 93, No. 436.
Japanese Office Action dated Mar. 15, 2005, from corresponding Japanese Application No. 262037/95.

* cited by examiner

*Primary Examiner*—Hosuk Song
(74) *Attorney, Agent, or Firm*—Beyer Weaver & Thomas, LLP

(57) ABSTRACT

A system for automatically encrypting and decrypting data packet sent from a source host to a destination host across a public internetwork. A tunnelling bridge is positioned at each network, and intercepts all packets transmitted to or from its associated network. The tunnelling bridge includes tables indicated pairs of hosts or pairs of networks between which packets should be encrypted. When a packet is transmitted from a first host, the tunnelling bridge of that host's network intercepts the packet, and determines from its header information whether packets from that host that are directed to the specified destination host should be encrypted; or, alternatively, whether packets from the source host's network that are directed to the destination host's network should be encrypted. If so, the packet is encrypted, and transmitted to the destination network along with an encapsulation header indicating source and destination information: either source and destination host addresses, or the broadcast addresses of the source and destination networks (in the latter case, concealing by encryption the hosts' respective addresses). An identifier of the source network's tunnelling bridge may also be included in the encapsulation header. At the destination network, the associated tunnelling bridge intercepts the packet, inspects the encapsulation header, from an internal table determines whether the packet was encrypted, and from either the source (host or network) address or the tunnelling bridge identifier determines whether and how the packet was encrypted. If the packet was encrypted, it is now decrypted using a key stored in the destination tunnelling bridge's memory, and is sent on to the destination host. The tunnelling bridge identifier is used particularly in an embodiment where a given network has more than one tunnelling bridge, and hence multiple possible encryption/decryption schemes and keys. In an alternative embodiment, the automatic encryption and decryption may be carried out by the source and destination hosts themselves, without the use of additional tunnelling bridges, in which case the encapsulation header includes the source and destination host addresses.

48 Claims, 7 Drawing Sheets

SYSTEM FOR SIGNATURELESS TRANSMISSION AND RECEPTION OF DATA PACKETS BETWEEN COMPUTER NETWORKS

Matter enclosed in heavy brackets [ ] appears in the original patent but forms no part of this reissue specification; matter printed in italics indicates the additions made by reissue.

*Cross-reference is made to U.S. application Ser. No. 10/147,933 which is a continuation Reissue Application of U.S. Pat. No. 5,548,646.*

BACKGROUND OF THE INVENTION

The present invention relates to the field of secure transmission of data packets, and in particular to a new system for automatically encrypting and decrypting data packets between sites on the Internet or other networks of computer networks.

It is becoming increasingly useful for businesses to transmit sensitive information via networks such as the Internet from one site to another, and concomitantly more urgent that such information be secured from uninvited eyes as it traverses the internetwork. At present, unsecured data is replicated at many sites in the process of being transmitted to a destination site, and trade secret or other private information, unless secured, is thereby made available to the public.

It is possible for a user at the sending host to encrypt the data to be sent, and to inform the user who is to receive the data of the encryption mechanism used, along with the key necessary to decrypt. However, this requires communication and coordinated effort on the parts of both the sending and receiving users, and often the users will not take the requisite trouble and the packets will go unencrypted.

Even when these packets are encrypted, the very fact of their being transmitted from user A to user B may be sensitive, and a system is needed that will also make this information private.

FIG. 1 illustrates a network of computer networks, including networks N1, N2 and N3 interconnected via a public network 10 (such as the Internet). When network N1 is designed in conventional fashion, it includes several to many computers (hosts), such as host A and additional hosts 20 and 30. Likewise, network N2 includes host B and additional hosts 40 and 50, while network N3 includes hosts 60–90. There may be many hosts on each network, and many more individual networks than shown here.

When a user at host A wishes to send a file, email or the like to host B, the file is split into packets, each of which typically has a structure such as network 400 shown in FIG. 7, including data 410 and a header 420. For sending over the Internet, the header 420 will be an internet protocol (IP) header containing the address of the receipt (destination) host B. In conventional fashion, each data packet is routed via the internetwork 10 to the receiving network N2, and ultimately to the receiving host B.

As indicated above, even if the user at host A encrypts the file or data packets before sending, and user B is equipped with the necessary key to decrypt them, the identities of the sending and receiving hosts are easily discernible from the Internet Protocol (IP) addresses in the headers of the packets. Current internetworks do not provide an architecture or method for keeping this information private. More basically, they do not even provide a system for automatic encryption and decryption of data packets sent from one host to another.

SUMMARY OF THE INVENTION

The system of the invention includes a tunnelling bridge positioned at the interface between a private network and a public network (or internetwork) for each of a number of such private networks. Each tunnelling bridge is a standalone computer with a processor and a memory, and in each tunnelling bridge's memory is a hosts table identifying which hosts should have their data packets (sent or received) encrypted. Alternatively, a networks table could be used, indicating whether data packets to and from particular networks should be encrypted; or other predetermined criteria may be stored that indicate whether particular data packets should be encrypted.

The tunnelling bridge for a given private network (or subnetwork of a private network) intercepts all packets sent outside the network, and automatically determines from the tables whether each such packet should be encrypted. If so, then the tunnelling bridge encrypts the packet using an encryption method and key appropriate for the destination host, adds an encapsulation header with source and destination address information (either host address or IP broadcast address for the network) and sends the packet out onto the internetwork.

At the destination host, another tunnelling bridge intercepts all incoming data packets, inspects the source and destination address information, and determines from its local hosts (or networks) table whether the packet should be decrypted, and if so, by what method and using what key. The packet is decrypted, if necessary, and sent on to the destination host.

In this way, all messages that are predetermined to require encryption, e.g. all messages from a given host A to another host B, are automatically encrypted, without any separate action on the part of the user. In this way, no one on the public internetwork can determine the contents of the packets. If the encapsulation header utilizes the network IP source and destination addresses, with the source and destination host addresses encrypted, then the host identities are also concealed, and an intervening observer can discern only the networks' identities.

The encapsulation header may include a field with an identifier of the source tunnelling bridge. This is particularly useful if more than one tunnelling bridge is to be used for a given network (each tunnelling bridge having different encryption requirements and information), and in this case the receiving tunnelling bridge decrypts the data packets according to locally stored information indicating the encryption type and decryption key for all packets coming from the source tunnelling bridge.

DESCRIPTION OF THE PREFERRED EMBODIMENTS

The system of the present invention is designed to be implemented in existing computer networks, and in the preferred embodiment uses the addition of a tunnelling bridge at junctions between local computer networks and public or larger-scale networks such as the Internet. The mechanisms for carrying out the method of the invention are implemented by computers acting as these tunnelling bridges, incorporating program instructions stored in memories of the tunnelling bridges and appropriate (standard) network connections and communications protocols.

Figure 3:
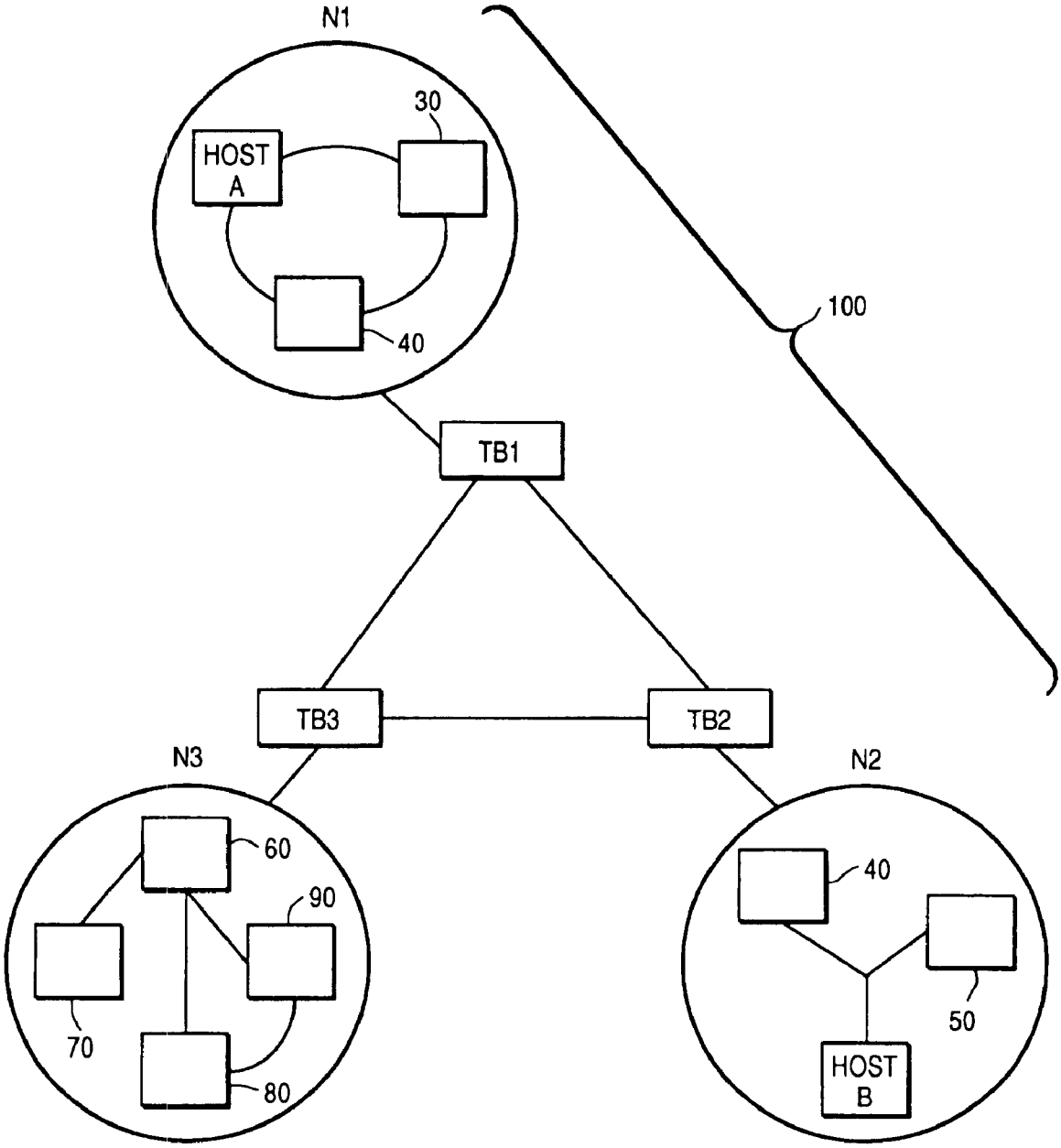
FIG. 3 is a diagram of a network of computer networks incorporating tunnelling bridges according to the present invention.

FIG. 3 shows a network 100 of networks N1, N2 and N3 according to the invention, where each network includes a tunnelling bridge—TB1, TB2 and TB3, respectively—which intercepts all data packets from or to the respective networks. Networks N1–N3 may in other respects be identical to networks N1–N3 in conventional designs. In the following description, any references to networks N1–N3 or hosts A and B should be taken as referring to the configuration shown in FIG. 3, unless specified otherwise.

Figure 1:
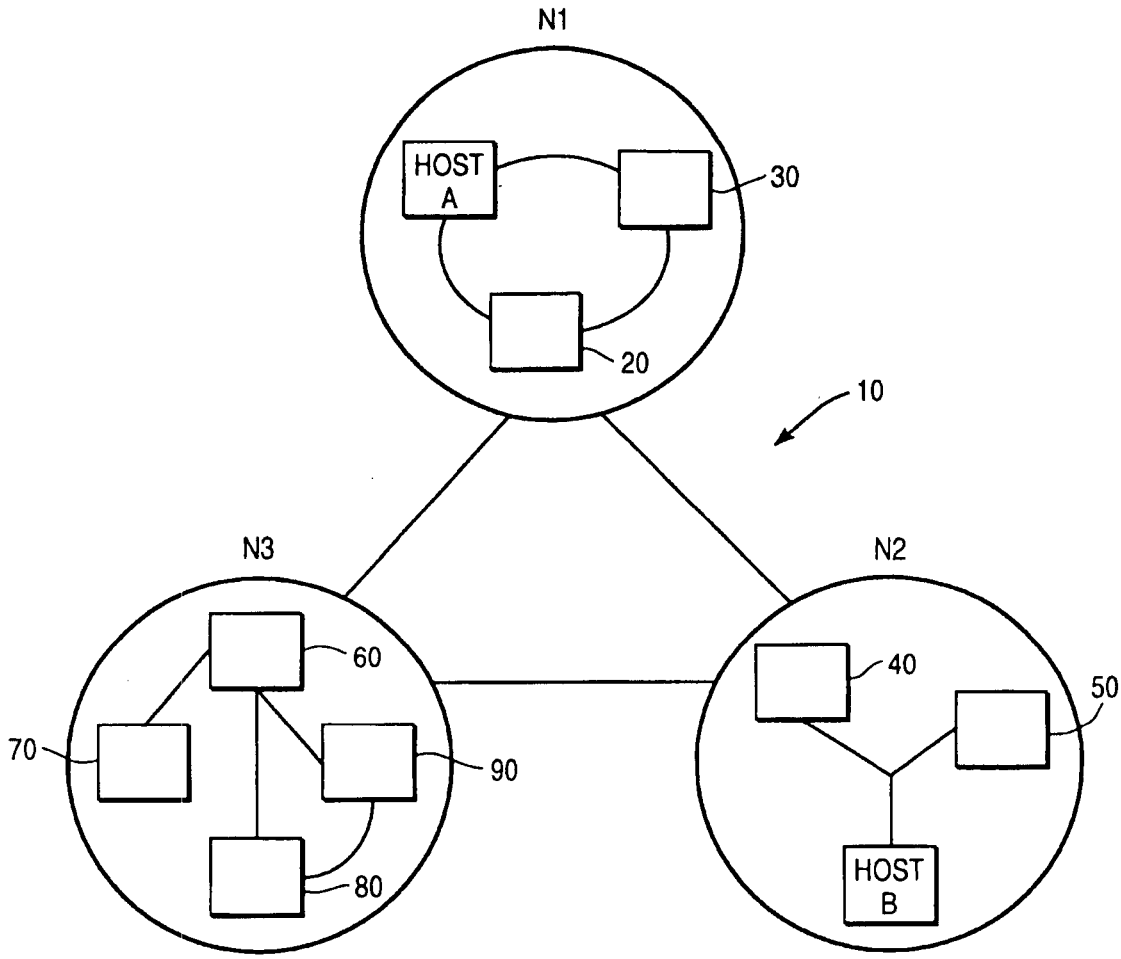
FIG. 1 is a diagram of a network of computer networks in conjunction with which the system of the present invention may be used.
Figure 2:
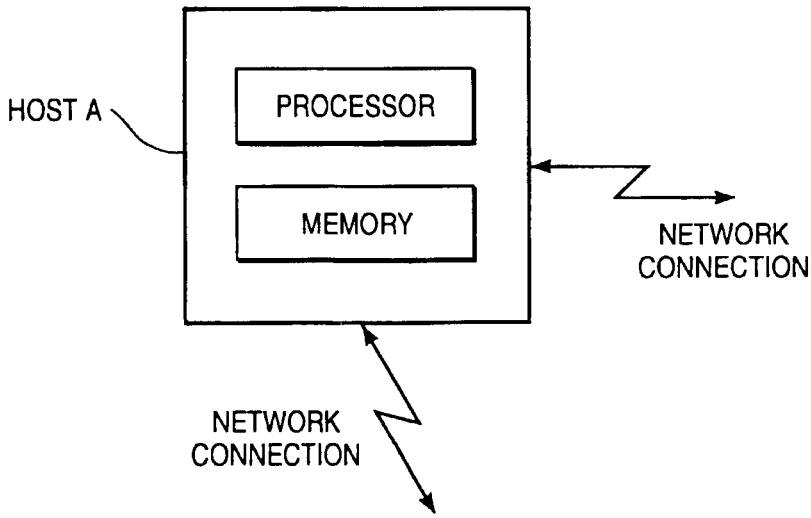
FIG. 2 is a block diagram of a host computer A on computer network N1 shown in FIG. 1.

In this system, there are several modes of operation, numbered and discussed below as modes 1, 2, 2A, 3 and 3A. Mode 1 uses the configuration of FIG. 1, while the other modes all use the configuration of FIG. 3. The features of the tunnelling bridges TB1 and TB2 (including their program instructions, actions taken, etc.) in modes 2–3A are, in mode 1, features of, respectively, hosts A and B.

Figure 4:
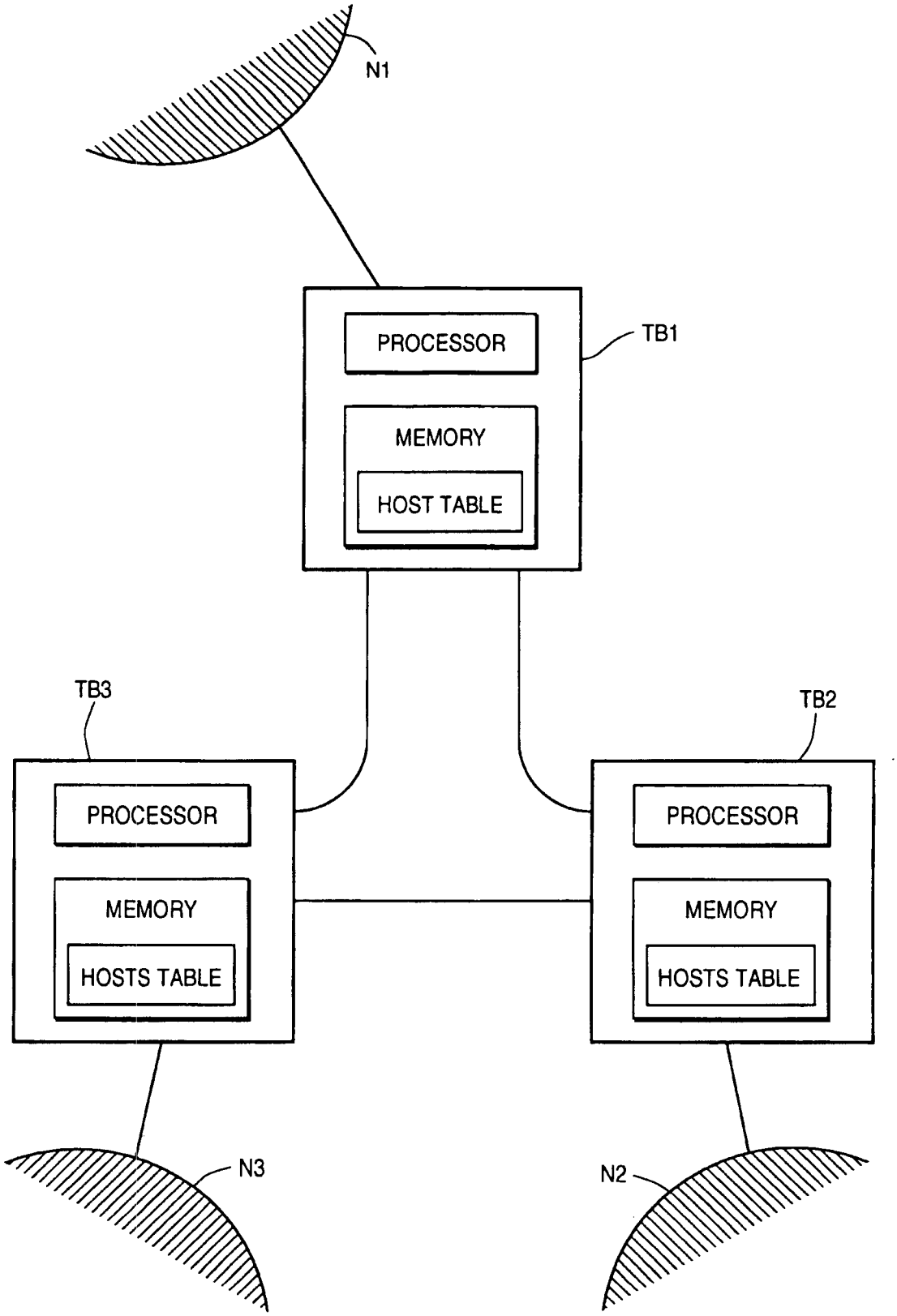
FIG. 4 is a block diagram of several tunnelling bridges of the present invention in a network of computer networks N1–N3 as shown in FIG. 3.

Each of the tunnelling bridges TB1–TB3 is preferably implemented in a separate, conventional computer having a processor and a memory, as shown in FIG. 4. The memory may be some combination of random-access-memory (RAM), read-only-memory (ROM), and other storage media, such as disk drives, CD-ROMs, etc. The program instructions for each of the bridges TB1–TB3 are stored in their respective memories, and are executed by their respective microprocessors. The method of the present invention is carried out by a combination of steps executed as necessary by each of the processors of the sending host A, the tunnelling bridges TB1 and TB2, and the receiving host B.

Encryption of data is an important step in the overall method of the invention, but the particular encryption mechanism used is not critical. It is preferable to use a flexible, powerful encryption approach such as the Diffie-Hellman method (see W. Diffie and M. Hellman, "New Directions in Cryptography", IEEE Transactions of Information Theory, November 1976). (The use of encryption in connection with IP data transfers is discussed in some detail in applicant's copending patent application, "Method and Apparatus for Key-Management Scheme for Use With Internet Protocols at Site Firewalls" by A. Aziz, Ser. No. 08/258,344 filed Jun. 10, 1994, which application is incorporated herein by reference.) However, any encryption scheme that provides for encryption by a first machine, which sends the data packets, and decryption by a receiving machine, will be appropriate.

Figure 6:
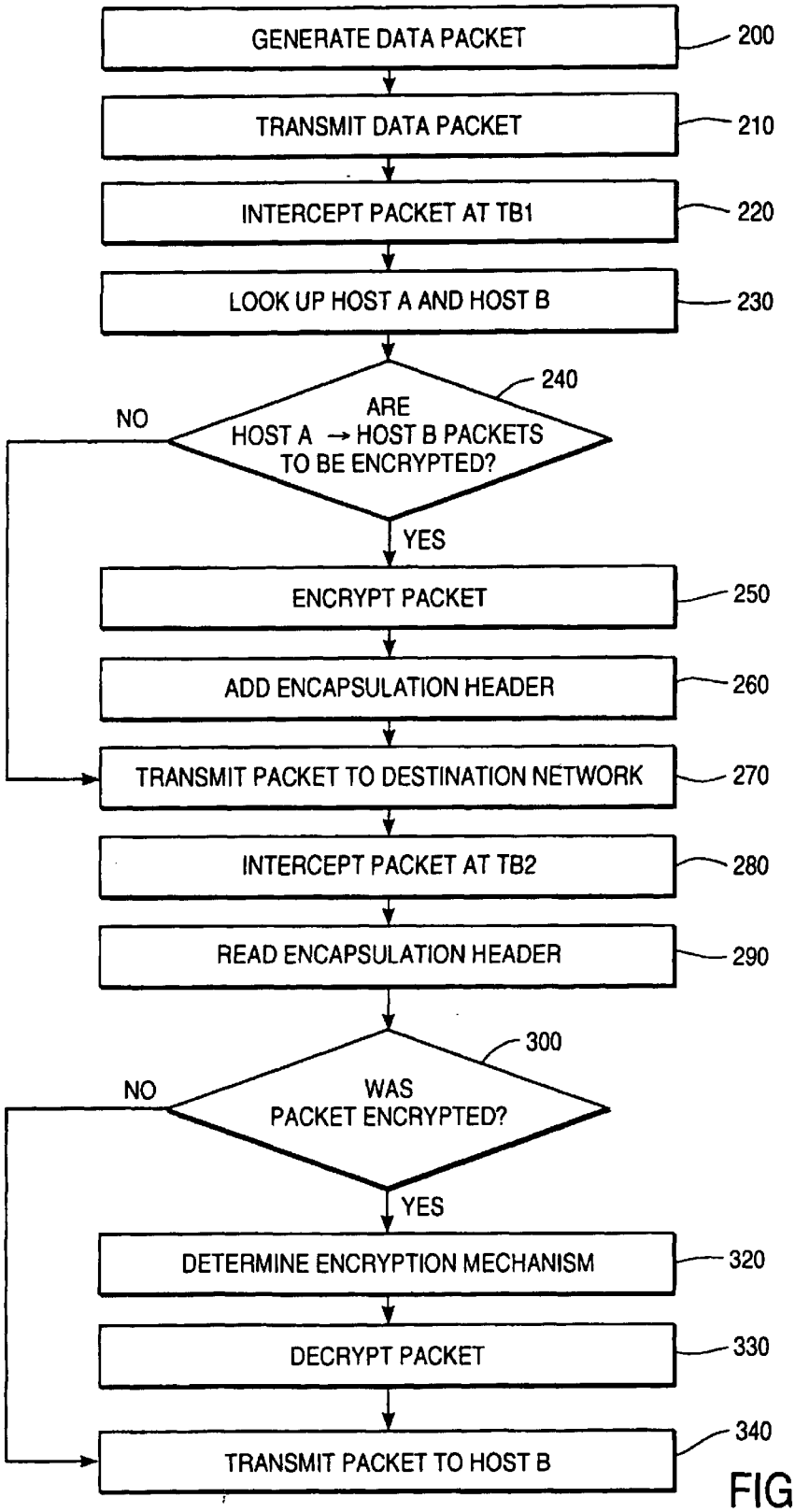
FIG. 6 is a flow chart illustrating the method of signatureless tunnelling of the present invention.
Figure 7:
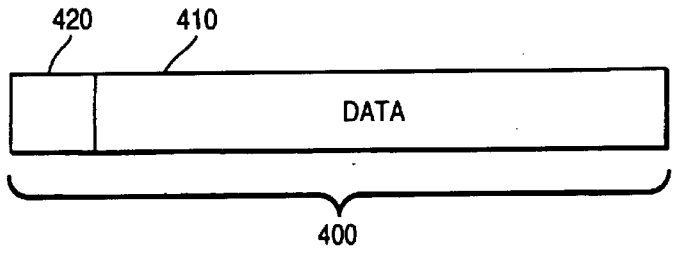
FIG. 7 illustrates a conventional data structure for a data packet.

FIG. 6 illustrates the method of the invention, and commences with the generation of data packets at the sending host A. The user at host A enters conventional commands for transmitting a file or the like from host A to host B, and the host computer A carries out the standard procedures for breaking the file down into data packets as in FIG. 7, each including both the data 410 and a header 400. In the case of transmissions over the Internet, this will be the IP header. Though the current discussion will be directed in large part to IP-specific implementations, it should be understood that any network protocol may be used in conjunction with the present invention.

At box 200, the user at host A (see FIGS. 3 and 6) enters the conventional command for sending the file, email, or the like to a recipient, and host A generates data packets for sending over the Internet in the normal fashion. Each data packet initially has a structure like that of data packet 400 shown in FIG. 7, including a data field 410 and a header field 420. The header 420 includes the destination address, in this example the IP address of host B.

The data packets are transmitted by host A at box 210, again in conventional fashion. However, at box 220, each packet is intercepted by the tunnelling bridge TB1 (see FIGS. 3 and 4), when any of the modes 2, 2A, 3 or 3A is used (see discussion below). When mode 1 (described below) is used, steps 220 and 280 are omitted, since this mode does not use tunnelling bridges; instead, the actions taken by the tunnelling bridges in modes 2–3A are all accomplished by the source and destination hosts themselves in mode 1. Thus, in the following discussion, wherever TB1 or TB2 is mentioned, it should be understood that in the case of mode 1, the same feature will be present in host A or host B, respectively.

Stored in the memory of TB1 (or host A, for mode 1) is a look-up table (not separately shown) of the addresses of hosts, both on the local network N1 and on remote networks such as N2 and N3, and an indication for each network whether data packets from or to that host should be encrypted. For instance, in this case the hosts table of TB1 indicates that any messages sent from host A to host B should be encrypted. Thus, bridge TB1 (or host A) looks up hosts A and B in its tables, and determines that the data packets to be transmitted must first be encrypted, as indicated at boxes 230 and 240 of FIG. 6.

Alternatively, the table could stored the network identifiers (e.g. broadcast addresses) or networks N1 and N2, indicating that anything sent from network N1 to network N2 is to be encrypted. In this case, the table need not list each host in each network, which makes the table smaller and easier to maintain.

If each host is listed, however, greater flexibility can be retained, since it may be that messages to or from particular hosts need or should not be encrypted. In an alternative embodiment, the look-up table lists the networks N1 and N2 as networks to and from which packets should be encrypted, and also includes a hosts sections of the table indicating exceptions to the normal encryption rule for these networks. Thus, if networks N1 and N2 are listed in the look-up table, then packets travelling from N1 to N2 should normally be encrypted; however, if there is an "exceptions" subtable indicating that no packets from host A are to be encrypted, then the normal rule is superseded. The exceptions can, of course, go both ways: where the normal rule is that the packets for a given network pair should/should not be encrypted, and the exception is that for this given host (source or recipient) or host pair, the packet should not/ should nonetheless be encrypted. In this embodiment, the small size and ease of maintenance of the network tables is by and large retained, while the flexibility of the hosts table is achieved.

If the data to be transmitted from host A to host B (or network N1 to network N2) should not be encrypted, then the method proceeds directly to step 270, and the packet in question is transmitted unencrypted to the destination, via the Internet (or other intervening network).

In this example, the packets are encrypted at box 250. This is carded out by the tunnelling bridge TB1, according to whichever predetermined encryption scheme was selected, the primary requirement being that of ensuring that TB2 is provided with the same encryption scheme so that it can decrypt the data packets. TB2 must also be provided in advance with the appropriate key or keys for decryption.

The Encapsulation Header

At box 260, an encapsulation header is appended to the encrypted data packet. This header can take one of several alternative forms, according to the requirements of the user. Several modes of packet modification can be accommodated using the same basic data structure (but with differences in the information that is appended in the encapsulation header), such as the following:

| Mode | Appended information |
|---|---|
| 1 | Encryption key management information (itself unencrypted) New IP header including originally generated IP addresses of source and destination hosts (unencrypted) |
| 2 | Encryption key management information (in encrypted form) Tunnelling bridge identifier for sender (unencrypted) New IP header including broadcast addresses of source and destination networks (unencrypted) |
| 2A | (Same as mode 2, but without the tunnelling bridge identifier.) |
| 3 | Encryption key management information (encrypted) Optional: tunnelling bridge identifier for sender (unencrypted) New IP header including originally generated IP addresses of source and destination hosts (unencrypted) |
| 3A | (Same as mode 3, but without the tunnelling bridge identifier.) |

Figure 8:
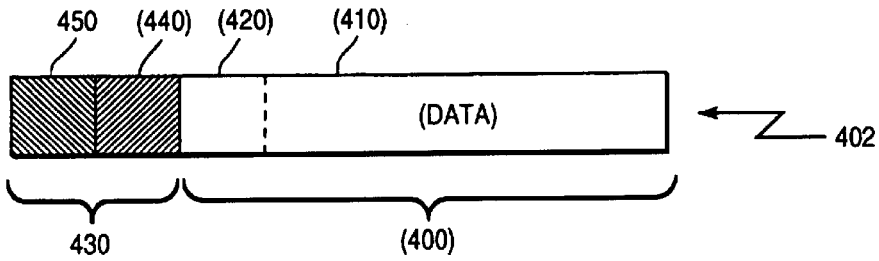
FIGS. 8–11 illustrate modified data structures for use in different embodiments of the system of the invention.
Figure 9:
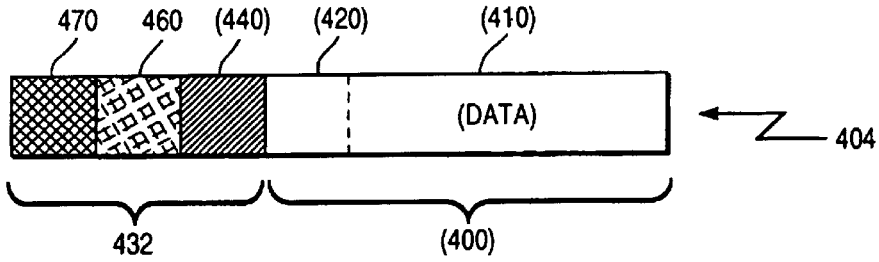
Figure 10:
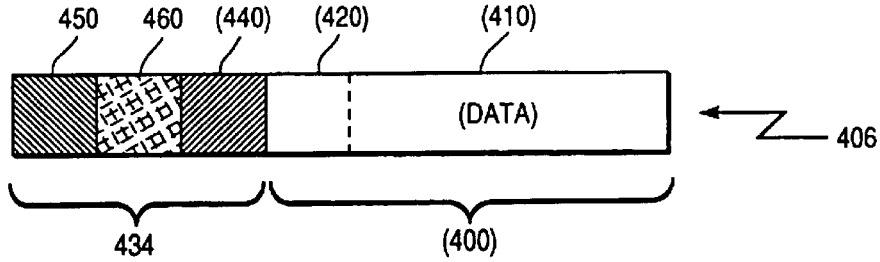
Figure 11:
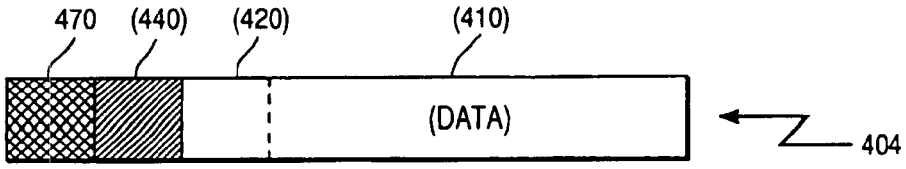

Data structures for modes 1, 2 and 3 are depicted in FIGS. 8, 9 and 10, respectively, wherein like reference numerals indicate similar features, as described below. The data structure for mode 2A is illustrated in FIG. 11, and mode 3A may use the data structure of FIG. 8.

The data structure 402 for mode 1 is represented in FIG. 8. The original data 410 and original header 420 are now encrypted, indicated as (410) and (420). Encryption key management information 440 is appended (in encrypted form) as pan of the new encapsulation header 430, along with a new IP header 450, including the addresses of the source and destination hosts. The information 430 includes indicates which encryption scheme was used.

Key management information can include a variety of data, depending upon the key management and encryption schemes used. For instance, it would be appropriate to use applicant's Simple Key-Management for Internet Protocols (SKIP), which is described in detail in the attached Appendix A.

In FIGS. 7–11, the fields with reference numerals in parentheses are encrypted, and the other fields are unencrypted. Thus, in FIG. 8, the original data field 410 and address field 420 are encrypted, while the new encapsulation header 430, including the key management information 440 and the IP header 450, is not encrypted.

In this embodiment, the tunnelling bridges TB1 and TB2 might not be used at all, but rather the hosts A and B could include all the instruction, tables, etc. necessary to encrypt, decrypt, and determine which packets are to be encrypted and using which encryption scheme. Mode 1 allows any intervening observer to identify the source and destination hosts, and thus does not provide the highest level of security. It does, however, provide efficient and automatic encryption and decryption for data packets between hosts A and B, without the need for additional computers to serve as TB1 and TB2.

Alternatively, in mode 1 field 440 could include the IP broadcast addresses of the source and destination networks (instead of that of the hosts themselves), and in addition may include a code in the encryption key management information indicating which encryption scheme was used. This information would then be used by an intercepting computer (such as a tunnelling bridge) on the destination network, which decrypts the data packet and sends it on to the destination host.

In mode 2, a data structure 404 is used, and includes a new encapsulation header 432. It includes key encryption management information 440, which is appended to the original data packet 400, and both are encrypted, resulting in encrypted fields (410), (420) and (440) shown in FIG. 9. A new IP header 470 including the broadcast addresses of the source and destination networks (not the addresses of the hosts, as in field 450 in FIG. 8) is appended. In addition, a tunnelling bridge identifier field 460 is appended as part of the encapsulation header 432. Here, fields 410, 420 and 440 in this embodiment are all encrypted, while fields 460 and 470 are not.

The tunnelling bridge identifier identifies the source tunnelling bridge, i.e. the tunnelling bridge at the network containing the host from which the packet was sent. The recipient tunnelling bridge contains a tunnelling bridge look-up table, indicating for each known tunnelling bridge any necessary information for decryption, most notably the decryption method and key.

An appropriate tunnelling bridge identifier might be a three-byte field, giving 224 or over 16 million unique tunnelling bridge identifiers. An arbitrarily large number of individual tunnelling bridges may each be given a unique identifier in this way, simply by making the field as large as necessary, and indeed the field may be of a user-selected arbitrarily variable size. If desired, a four-byte field can be used, which will accommodate over 4 billion tunnelling bridges, far exceeding present needs.

Using mode 2, any observer along the circuit taken by a given data packet can discern only the tunnelling bridge identifier and the IP broadcast addresses for the source and destination networks.

The IP broadcast address for the destination network will typically be something like "129.144.0.0", which represents a particular network (in this case, "Eng.Sun.COM") but not any specific host. Thus, at intermediate points on the route of the packet, it can be discerned that a message is traveling from, say, "washington.edu" to "Eng.Sun.COM", and the identification number of the receiving tunnelling bridge can be determined, but that is the extent of it; the source and destination hosts, the key management information, and the contents of the data packet are all hidden.

Mode 2A uses the data structure shown in FIG. 11, wherein the IP broadcast addresses for the source and recipient networks N1 and N2 are included in the encapsulation header field 470, but no tunnelling bridge identifier is used. This embodiment is particularly suitable for networks where there is only one tunnelling bridge for the entire network, or indeed for several networks, as illustrated in FIG. 5.

Figure 5:
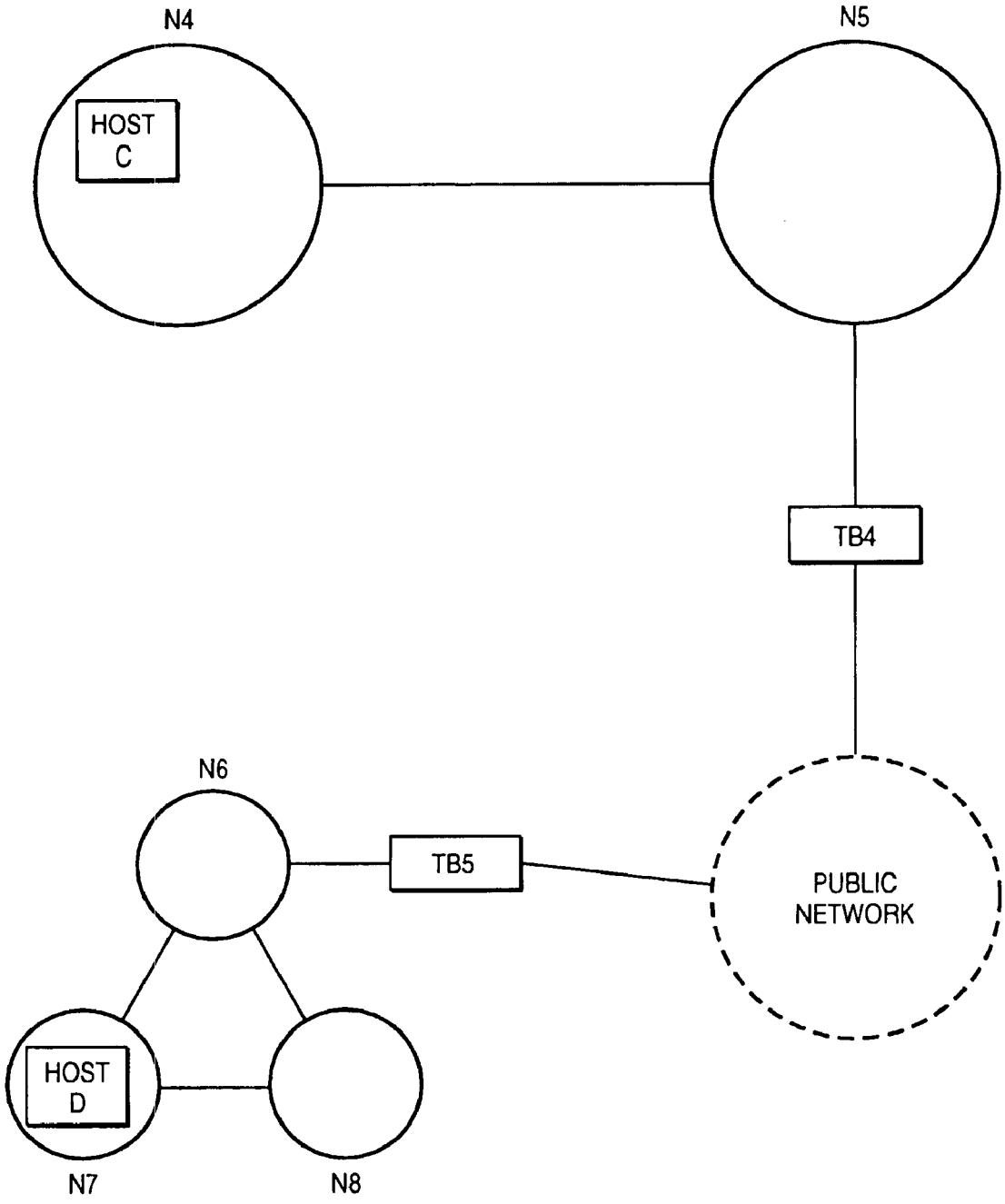
FIG. 5 is a diagram of another configuration of networks incorporating tunnelling bridges according to the present invention.

In FIG. 5, a packet sent from host C to host D will first be sent from network N4 to network N5, and will then be intercepted by the tunnelling bridge TB4, which intercepts all messages entering or leaving these two networks. TB4 will encrypt the packet or not, as indicated by its hosts look-up table. The packet traverses the public network and is routed to network N7, first being intercepted by tunnelling bridge TB5 (which intercepts all messages entering or leaving networks N6–N8), and at that point being decrypted if necessary.

In this embodiment or any embodiment where a packet is sent from a tunnelling bridge on a network where a single tunnelling bridge is used for the entire source network or for multiple networks which include the source network, a tunnelling bridge identifier is not a necessary field in the encapsulation header. Since in this case only a given tunnelling bridge could have intercepted packets from a given host (e.g., TB4 for host C in FIG. 5), the identity of the source tunnelling bridge is unambiguous, and the destination tunnelling bridge TB5 will include a table of hosts and/or networks cross-correlated with TB4. Having determined that tunnelling bridge TB4 was the source tunnelling bridge, TB5 then proceeds with the correct decryption.

This approach has certain advantages, namely that it eliminates the need to "name" or number tunnelling bridges, and reduces the sizes of the data packets by eliminating a field. However, a tunnelling bridge identifier field provides flexibility. For instance, in FIG. 12, subnetworks N11 and N12 are part of one larger network N10, and each subnetwork N11 and N12 has its own assigned tunnelling bridge (TB7 and TB8, respectively). Thus, subnetworks N11 and N12 can be subjected to different types of encryption, automatically, and that encryption can be altered at will for one subnetwork, without altering it for the other.

Figure 12:
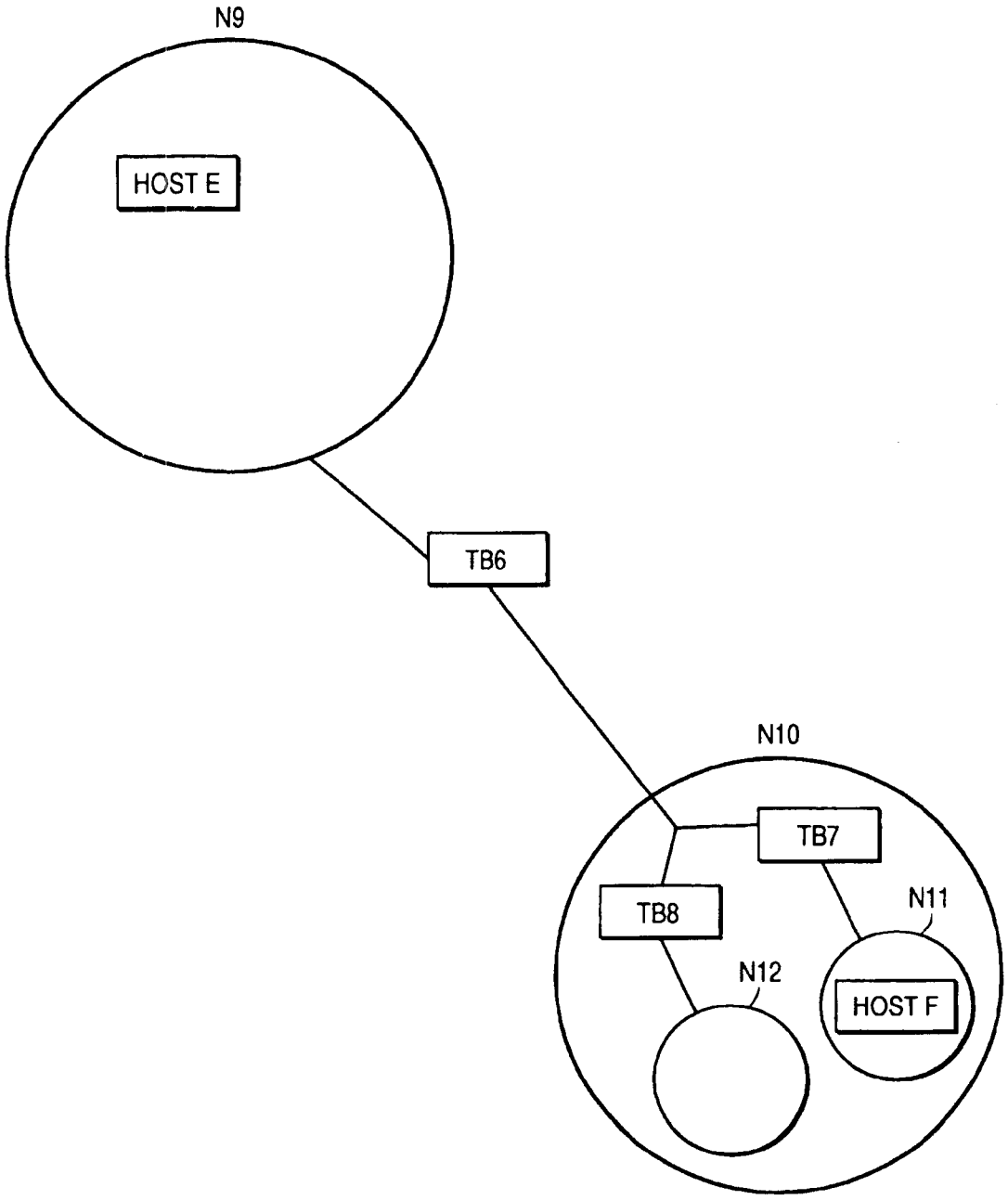
FIG. 12 is a block diagram of a network of computer networks including two tunnelling bridges of the invention on a single computer network.

A packet traveling from host F to host E in FIG. 12 will include a source tunnelling bridge identifier (TB7) so that, when it reaches TB6 at network N9, it is identified correctly as having been encrypted by TB7 and not TB8. In this way, tunnelling bridge TB6 need maintain a table only the information pertaining to the tunnelling bridges, and does not need to maintain encryption/decryption specifies for the host or network level. (Note that TB6 still maintains information relating to whether to encrypt messages sent between host A and host B or network N1 and network N2, as the case may be, as discussed above.)

The tunnelling bridge identifier may be used for a variety of other purposes relating to the source tunnelling bridge, such as statistics recording the number of packets received from that tunnelling bridge, their dates and times of transmission, sizes of packets, etc.

An alternative to the use of hosts or networks tables in the memories of the source and destination tunnelling bridges (or source and destination hosts, as the case may be) would be any information identifying one or more predetermined criteria by which the source host or source tunnelling bridge determines whether to encrypt a given data packet. Such criteria need not merely be source and destination information, but could include packet contents, time of transmission, subject header information, user id., presence of a key word (such as "encrypt") in the body of the packet, or other criteria.

Mode 3 uses a data structure 406 as shown in FIG. 10, which is identical to the data structure 402 except for the addition of field 460 containing the tunnelling bridge identifier, which is the same as the tunnelling bridge identifier discussed above relative it mode 2.

In this embodiment, as in mode 1, field 450 includes the original host IP addresses for the source and destination hosts (not the addresses of the networks, as in mode 2), and thus an observer of a mode 3 packet will be able to determine both the original sender of the data packet and the intended receiver. Either mode contains sufficient information to route packets through an internet to recipient network's tunnelling bridge for decryption and ultimate delivery to the recipient host.

Mode 3A may use the data structure shown in FIG. 8, in conjunction with a network configuration such as those shown in FIGS. 3 or 12. The mechanisms and relative advantages are identical to those described above for mode 2A, while the structure reveals the source and destination host addresses.

Whichever encapsulation header is added at box 260 (sec FIG. 6), the packet is, at box 270, then transmitted to the destination network. At box 280, the destination network's tunnelling bridge (here, TB2 shown in FIG. 3) intercepts the packet, which is accomplished by an instruction routine by which all packets are intercepted and inspected for encapsulation header information indicating encryption.

Thus, at box 290, the encapsulation header of the packet is read, and at box 300 it is determined whether the packet was encrypted. If a tunnelling bridge identifier forms a part of the encapsulated packet, then the method of encryption and decryption key are determined from the destination tunnelling bridge's (or destination host's, in the case of mode 1) local tables.

If no encryption was carried out on the packet, then it is sent on without further action to the correct host, as indicated at box 340. Otherwise, its encryption method is determined (box 320), and the packet is decrypted accordingly (box 330), and then sent on as in box 340.

APPENDIX A

Simple Key-Management For Internet Protocols (SKIP) Abstract

There are occasions where it is advantageous to put authenticity and privacy features at the network layer. The vast majority of the privacy and authentication protocols in the literature deal with session oriented key-management schemes. However, many of the commonly used network layer protocols (e.g IP and IPng) are session-less datagram oriented protocols. We describe a key-management scheme that is particularly well suited for use in conjunction with a session-less datagram protocol like IP or IPng. We also describe how this protocol may be used in the context of Internet multicasting protocols. This key-management scheme is designed to be plugged into the IP Security Protocol (IPSP) or IPng.

1.0 Overview

Any kind of scalable and robust key-management scheme that needs to scale to the number of nodes possible in the Internet needs to be based on an underlying public-key certificate based infrastructure. This is the direction that, e.g, the key-management scheme for secure Internet e-mail, Privacy Enhanced Mail or PEM [1], is taking.

The certificates used by PEM are RSA public key certificates. Use of RSA public key certificates also enable the establishment of an authenticated session key [2,3]. (By an RSA public key certificate, what is meant here is that the key being certified is an RSA public key.)

One way to obtain authenticity and privacy at a datagram layer like IP is to use RSA public key certificates. (In the following description we use the term IP, although IP is replacable by IPng in this context).

There are two ways RSA certificates can be used to provide authenticity and privacy for a datagram protocol. The first way is to use out-of-band establishment of an authenticated session key, using one of several session key establishment protocols. This session key can then be used to encrypt IP data traffic. Such a scheme has the disadvantage of establishing and maintaining a pseudo session state underneath a session-less protocol. The IP source would need to first communicate with the IP destination in order to acquire this session key.

Also, as and when the session key needs to be changed, the IP source and the IP destination need to communicate again in order to make this happen. Each such communication involves the use of a computationally expensive public-key operation.

The second way an RSA certificate can be used is to do in-band signalling of the packet encryption key, where the packet encryption key is encrypted in the recipient's public key. This is the way, e.g, PEM and other public-key based secure e-mail systems do message encryption. Although this avoids the session state establishment requirement, and also does not require the two parties to communicate in order to set up and change packet encryption keys, this scheme has the disadvantage of having to carry the packet encryption key encrypted in the recipient's public key in every packet.

Since an RSA encrypted key would minimally need to be 64 bytes, and can be 128 bytes, this scheme incurs the overhead of 64–128 bytes of keying information in every packet. (As time progresses, the RSA block size would need to be closer to 128 bytes simply for security reasons.) Also, as and when the packet encryption key changes, a public key operation would need to be performed in order to recover the new packet encryption key. Thus both the protocol and computational overhead of such a scheme is high.

Use of certified Diffie-Hellman (DH) [4] public-keys can avoid the pseudo session state establishment and the communications requirement between the two ends in order to acquire and change packet encrypting keys. Furthermore, this scheme does not incur the overhead of carrying 64–128 bytes of keying information in every packet.

This kind of key-management scheme is better suited to protocols like IP, because it doesn't even require the remote side to be up in order to establish and change packet encryption keys. This scheme is described in more detail below.

2.0 Simple Key-Management for Internet Protocols (SKIP)

We stipulate that each IP based source and destination has a certified Diffie-Hellman public key. This public-key is distributed in the form of a certificate. The certificate can be signed using either an RSA or DSA signature algorithm. How the certificates are managed is described in more detail later.

Thus each IP source or destination I has a secret value i, and a public value gi mod p. Similarly, IP node J has a secret value j and a public value gj mod p.

Each pair of IP source and destination I and J can acquire a shared secret g**ij mod p. They can acquire this shared secret without actually having to communicate, as long as the certificate of each IP node is known to all the other IP nodes. Since the public-key is obtained from a certificate, one natural way for all parties to discover the relevant public-keys is to distribute these certificates using a directory service.

This computable shared secret is used as the basis for a key-encrypting-key to provide for IP packet based authentication and encryption. Thus we call gij mod p the long-term secret, and derive from it a key Kij. Kij is used as the key for a shared-key cryptosystem (SKCS) like DES or RC2**.

Kij is derived from gij mod p by taking the high order key-size bits of gij mod p. Since g**ij mod p is minimally going to be 512 bits and for greater security is going to be 1024 bits or higher, we can always derive enough bits for use as Kij which is a key for a SKCS. SKCS key sizes are typically in the range of 40–256 bits.

An important point here is that Kij is an implicit pair-wise shared key. It does not need to be sent in every packet or negotiated out-of-band. Simply by examining the source of an IP packet, the destination IP node can compute this shared key Kij. Because this key is implicit, and is used as a master key, its length can be made as long as desired, without any additional protocol overhead, in order to make cryptanalysis of Kij arbitrarily difficult.

We use Kij to encrypt a transient key, which we call Kp (for packet key). Kp is then used to encrypt/authenticate an IP packet or collection of packets. This is done in order to limit the actual amount of data in the long-term key. Since we would like to keep the long-term key for a relatively long period of time, say one or two years, we don't encrypt the actual IP data traffic in key Kij.

Instead we only encrypt transient keys in this long-term key, and use the transient keys to encrypt/authenticate IP data traffic. This limits the amount of data encrypted in the long-term key to a relatively small amount even over a long period of time like, say, one year.

Thus the first time an IP source I, which has a secret value i, needs to communicate with IP destination J, which has a secret value j, it computes the shared secret g**ij mod p. It can then derive from this shared secret the long-term key Kij. IP source I then generates a random key Kp and encrypts this key using Kij. It encrypts the relevant portion of the IP packet in key Kp (which may be the entire IP packet or just the payload of the IP packet depending on the next-protocol field in IPSP protected data potion).

The value of the SAID field is used by SKIP to indicate the mode of processing and to identify the implicit interchange key. Typical modes of processing are encrypted, encrypted-authenticated, authenticated, compression etc.

The modes of operation are identified by the upper 6 bits of the SAID field. The meanings of these upper 6 bits is specified in section 2.5 below on SAID derived processing modes. The low 22 bits of the SAID field are zero.

If the next protocol field is IP, (in other words IPSP is operating in encrypted-encapsulated mode), the packet looks as follows. It sends the encrypted IP packet, the encrypted key Kp, encapsulated in a clear outer IP Header.

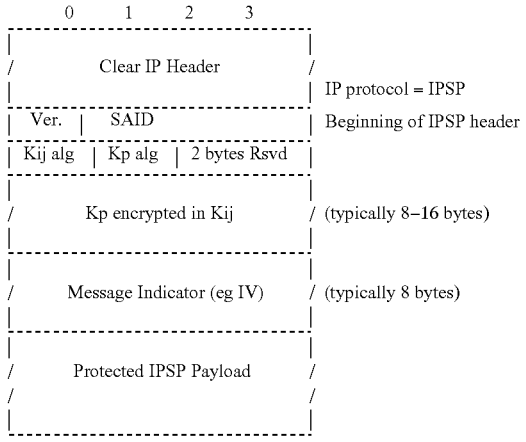

In order to prepare this packet for emission on the outbound side of IP node I, no communication was necessary with IP node J.

When IP node J receives this packet, it also computes the shared secret Kij and caches it for later use. (In order to do this, if it didn't already possess I's certificate, it may have obtained this from the local directory service.) Using Kij it obtains Kp, and using Kp it obtains the original IP packet, which it then delivers to the appropriate place which is either a local transport entity or another outbound interface.

The Message Indicator (MI) is a field that is needed to preserve the statelessness of the protocol. If a single key is used in order to encrypt multiple packets, (which is highly desirable since changing the key on a per packet basis constitutes too much overhead) then the packets need to be decryptable regardless of lost or out-of-order packets. The message indicator field serves this purpose.

The actual content of the MI field is dependent on the choice of SKCS used for Kp and its operating mode. If Kp refers to a block cipher (e.g., DES) operating in Cipher-Block-Chaining (CBC) mode, then the MI for the first packet encrypted in key Kp is the Initialization Vector (IV). For subsequent packets, the MI is the last blocksize-bits of ciphertext of the last (in transmit order) packet. For DES or RC2 this would be last 64 bits of the last packet. For stream ciphers like RC4, the MI is simply the count of bytes that have already been encrypted in key Kp (and can be 64 bits long also).

If the source IP node (I in this case) decides to change the packet encryption key Kp, the receiving IP node J can discover this fact without having to perform a public-key operation. It uses the cached value Kij to decrypt the encrypted packet key Kp, and this is a shared-key cryptosystem operation. Thus, without requiting communication between transmitting and receiving ends, and without necessitating the use of a public-key operation, the packet encrypting key can be changed by the transmitting side.

Since the public keys in the certificates are DH public keys, the nodes themselves have no public-key signature algorithm. This is not a major problem, since signing on a per-packet basis using a public-key cryptosystem is too cumbersome in any case. The integrity of the packets is determined in a pairwise fasion using a symmetric cryptosystem.

2.1 SKIP for Packet Authentication

In order to achieve authentication in the absence of privacy, SKIP compliant implementation use the encrypted packet key Kp to encrypt a message-digest of the packet, instead of the packet itself. This encrypted digest is appended at the end of the data portion of the IPSP. As before, Kij alg and Kp alg identify the two encryption algorithms for keys Kij and Kp. MD alg is a 1 byte identifier for the message digest algorithm.

This mode of operation is indicated by the SAID value which is further specified in Section 2.x.

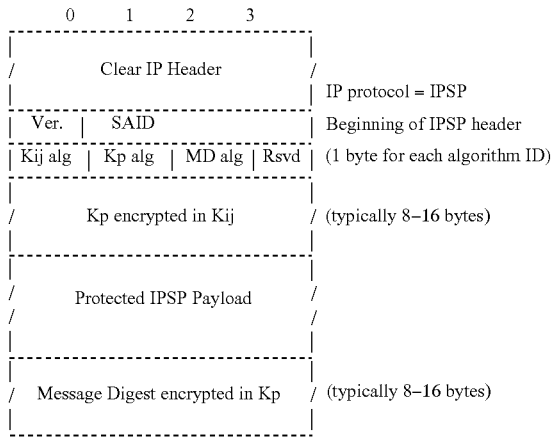

2.2 Intruder in the Middle Attacks

Unauthenticated Diffie-Hellman is susceptible to an intruder in the middle attack. To overcome this, authenticated Diffie-Hellman schemes have been proposed, that include a signature operation with the parties private signature keys.

SKIP is not susceptible to intruder in the middle types of attacks. This is because the Diffie-Hellman public parameters are long-term and certified. Intruder in the middle attacks on Diffie-Hellman assume that the parties cannot determine who the public Diffie-Hellman keys belong to. Certified Diffie-Hellman public keys eliminate this possibility, without requiting any exchange of messages between the two parties or incurring the computational overhead of large exponent exponentiations (e.g., RSA signatures).

2.3 Storage of Cached Keys

Since the Kij values need to be cached for efficiency, reasonable safeguards need to be taken to protect these keys.

One possible way to do this is to provide a hardware device to computer, store and perform operations using these keys. This device can ensure that there are no interfaces to extract the key from the device.

2.4 Manual Keying

As an interim measure, in the absence of certification hierarchies, nodes may wish to employ manually exchanged keying information. To handle such cases, the pair key Kij can be the key that is manually set up.

Since manual re-keying is a slow and awkward process, it still makes sense to use the two level keying structure, and encrypt the packets has the same benefit as before, namely it avoids over-exposing the pair key which is advantageous to maintain over relatively long periods of time. This is particularly true for high-speed network links, where it is easy to encrypt large amounts of data over a short period of time.

2.5 Processing Modes and SAID Values

The upper 6 bits of the SAID field are used to indicate the processing mode. The processing modes defined so far are, encryption, authentication, compression, and packet sequencing (for playback protection). Since none of these modes is mutually exclusive, multiple bits being on indicate the employment of all the relevant processing modes.

| Bit 22 | Bit 23 | Bit 24 | Bit 25 | Bit 26 | Bit 27 |
|---|---|---|---|---|---|
| Encrypted | Authenticated | Compressed | Sequenced | Rsvd | Rsvd |

Bit 22=1 if packet is encrypted, Bit 22=0 otherwise

Bit 23=1 if packet is authenticated, Bit 23=0 otherwise

Bit 24=1 if packet is compressed before encryption, Bit 24=0 otherwise,

Bit 25=1 if packets are sequenced, Bit 25=0 otherwise

Bits 26 and 27 are reserved for future use, and shall be 0 until specified.

For example, to indicate that a packet is encrypted and authenticated, Bits 22 and 23 shall be one.

3.0 SKIP for Multicast IP

It is possible to use this kind of scheme in conjunction with datagram multicasting protocols like IP (or IPng) multicast [5]. This requires key-management awareness in the establishment and joining process of multicast groups.

In order to distribute multicast keying material, the notion of a group owner needs to exist. When secure multicasting to multicast address M is required, a group membership creation primitive will need to establish the group secret value Km and the membership list of addresses that are allowed to transmit and receive encrypted multicast datagrams to and from group address M.

The group key Km is not used as a packet encryption key, but rather as the group Interchange Key (IK).

Nodes wishing to transmit/receive encrypted datagrams to multicast address M need to acquire the group IK Km. This is done by sending an encrypted/authenticated request to join primitive to the group owner. If the requesting node's address is part of the group's membership, then the group owner will send the IK Km, and associated lifetime information in an encrypted packet, using the pairwise secure protocol described in Section 2 above.

Transmitting nodes to group address M will randomly generate packet encryption keys Kp, and encrypt these keys using Km. The packet structure is similar to the structure used for encrypted unicast IPSP packets, except for the fact that the packet keys Kp are not encrypted in the pair-wise keys Kij, but instead are encrypted using the group IK Km. An example encrypted multicast packet is shown below.

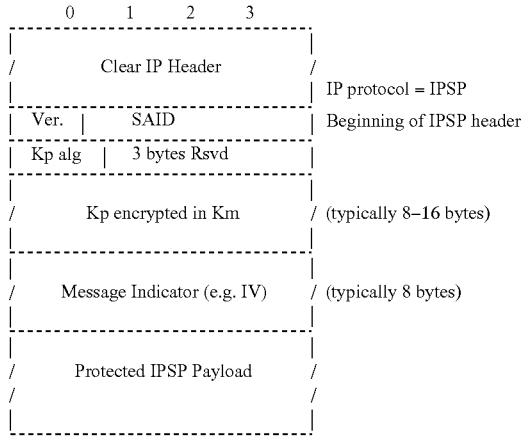

There are two distinct advantages of this scheme. First, every member of the multicast group can change packet encryption keys as often as it desires, without involving key-setup communications overhead involving every member of the group.

Second, since all the packet encryption keys are different, there is no, problem in using stream-ciphers with multicast. This is because each source of encrypted traffic uses a different key-stream and thus there is no key-stream reuse problem. If all members of the multicast group used the same packet encryption key (as e.g stipulated in the current draft of 802.10 key-management), then key-seeded stream ciphers could not be used with multicast.

How the identity of the group owner is established and communicated to the participating nodes is left to the application layer. However, this also needs to be done in a secure fashion, otherwise the underlying key-management facility can be defeated.

4.0 Management of DH Certificates

Since the nodes' public DH values are communicated in the form of certificates, the same sort of multi-tier certification structure that is being deployed for PEM [6] and also by the European PASSWORD project can be used. Namely, there can be a Top Level Certifying Authority (TLCA) which may well be the same the Internet Policy Registration Authority (IPRA), Policy Certifying Authorities (PCAs) at the second tier and organizational CAs below that.

In addition to the identity certificates, which are what are part of PEM certificate infrastructure, we also need additional authorization certificates, in order to properly track the ownership of IP addresses. Since we would like to directly use IP addresses in the DH certificates, we cannot use name subordination principles alone (as e.g used by PEM) in order to determine if a particular CA has the authority to bind a particular IP address to a DH public value.

We can still use the X.509/PEM certificate format, since the subject Distinguished Name (DN) in the certificate can be the numeric string representation of a list of IP addresses.

Since the nodes only have DH public keys, which have no signature capability, the nodes are themselves unable to issue certificates. This means that there is an algorithmic termination of a certificate path in a leaf node, unlike the certificate hierarchy employed in, e.g PEM, where every leaf node is potentially a rogue CA.

The node certificates are issued by organizational CAs which have jurisdiction over the range of IP addresses that are being certified. The PCAs will have to perform suitable checks (in line with the advertised policy of that PCA) to confirm that the organization which has jurisdiction over a range of addresses is issued a certificate giving it the authority to certify the DH values of individual nodes with those addresses. This authority will be delegated in the form of a authorization certificate signed by the PCA. For the purposes of authorization, the CA's Distinguished Name (DN) will be bound to the range of IP addresses over which it has jurisdiction. The CA has either an RSA or DSA certificate issued by the PCA.

An authorization certificate will also contain information about whether the CA to whom authority is being delegated can sub-delegate that authority. The CA which has delegatable authority over a range of IP addresses can delegate authority over part of the range to a subordinate CA, by signing another authorization certificate using its own private key. If the authority is non-delegatable, then the CA cannot delegate authority for that range of addresses.

The range of IP addresses are identified in the authorization certificate in the form of a list of IP address prefix, length pairs.

5.0X.509 Encoding of SKIP DH Certificates

5.1 Encoding of DH Public Values

The encoding of a DH Public value in an X.509 certificate will be in the form of an INTEGER. The algorithm indentifier will be as defined in PKCS #3 [7]. Thus

```
DHPublicKey:=INTEGER
```

and from PKCS #3,

```
AlgorithmIdentifier ::=
    SEQUENCE {
        algorithm      OBJECT IDENTIFIER
            SEQUENCE {
                prime INTEGER, — p
                base INTEGER, — g
                privateValueLength INTEGER OPTIONAL
            }
    }
```

with the OBJECT IDENTIFIER value being

```
dhKeyAgreement OBJECT IDENTIFIER ::=
    {iso(1) member-body(2) US(840)
        rsadsi(113549) pkcs(1) 3 1}
```

which is also taken from PKCS #3.

DHPublicKey is what gets encapsulated as the BIT STRING in SubjectPublicKeyInfo of an X.509 certificate in the obvious manner.

5.2 Encoding of the Distinguished Name (DN)

The certificate is allowed to bind multiple IP addresses to a single public value to accommodate cases where a single IP node has multiple IP addresses. The SEQUENCE OF construct in a DN readily allows for this. What is needed is an OBJECT IDENTIFIER for an AttributeType specifying an IP address. This is defined here as,

```
ipAddress ATTRIBUTE          WITH ATTRIBUTE-SYNTAX
        PrintableString (SIZE(1..nh-ipAddress))
    ::= {ipsec-odd 1}        — Need to register this XXX
        The DN in the certificate can contain multiple
```

of these by iterating on the SEQUENCE OF construct of the Relative Distinguished Name Sequence.

The Printable string contains either the hexadecimal representation or standard dot notation representation of an IP address.

5.3 Encoding of an Authorization Certificate

An authorization certificate is associated with each CA below the PCA level. The authorization certificate in effect entitles a CA to bind IP addresses to DH public keys.

6.0 Conclusions

We have described a scheme, Simple Key-Management for Internet Protocols (SKIP) that is particularly well suited to connectionless datagram protocols like IP and its replacement candidate SIPP. Both the protocol and computational overheads of this scheme are relatively low. In-band signalled keys incur the length overhead of the block size of a shared-key cipher. Also, setting and changing packet encrypting keys involves only a shared-key cipher operation. Yet the scheme has the scalability and robustness of a public-key certificate based infrastructure.

A major advantage of this scheme is that establishing and changing packet encrypting keys requires no communication between sending and receiving nodes and no establishment of a pseudo-session state between the two sides is required.

In many ways the key-management scheme here has structural similarities with the scheme used by PEM [1]. Both use the concept of an inter-change key (in our case that is the pair keys Kij) and data encrypting keys (the packet encryption keys Kp). By using the Implicit shared secret property of long-term DH public values, and treating the resulting keys as keys for a SKCS, we have reduced the protocol overhead substantially as compared to the overhead of PEM when used in conjunction with an asymmetric key-management system.

We have also described how this scheme may be used in conjunction with datagram multicast protocols, allowing a single encrypted datagram to be multicast to all the receiving nodes.

References

[1] IETF PEM RFCs 1421–1424

[2] A. Aziz, W. Diffie, "Privacy and Authentication for Wireless LANs", IEEE Personal Communications, Feb 1994.

[3] W. Diffie, M. Wiener, P. Oorschot, "Authentication and Authenticated Key Exchanges", in Designs Codes and Cryptography, Kluwer Academic Publishers, 1991.

[4] W. Diffie, M. Hellman, "New Directions in Cryptography", IEEE Transactions on Information Theory

[5] S. Deering, "IP Multicast", Ref needed

[6] S. Kent, "Certificate Based Key Management," RFC 1422 for PEM

[7] "Public Key Cryptography Standards" 1–10 from RSA Data Security Inc., Redwood City, Calif.

Each of the above references is incorporated into this Appendix A by reference.

What is claimed is:

1. A method for transmitting and receiving packets of data via [a] *an* internetwork from a first host computer on a first computer network to a second host computer on a second computer network, the first and second computer networks including, respectively, first and second bridge computers, each of said first and second host computers and first and second bridge computers including a processor and a memory for storing instructions for execution by the processor, each of said first and second bridge computers further including memory for storing at least one predetermined encryption/decryption mechanism and information identifying a predetermined plurality of host computers as hosts requiring security for packets transmitted between them, the method being [carded] *carried* out [be] *by* means of the instructions stored in said respective memories and including the steps of:

(1) generating, by the first host computer, a first data packet for transmission to the second host computer, a portion of the *first* data packet including information representing an internetwork address of the first host computer and an internetwork address of the second host computer;

(2) in the first bridge computer, intercepting the first data packet and determining whether the first and second host computers are among the predetermined plurality of host computers for which security is required, and if not, proceeding to step 5, and if so, proceeding to step 3;

(3) encrypting the first data packet in the first bridge computer;

(4) in the first bridge computer, generating and appending to the *encrypted* first data packet an encapsulation header, including:

(a) key management information [identifying] *providing a mechanism for identifying* the predetermined encryption method, and (b) a new address header representing the source and destination for the *first* data packet, hereby generating a modified *first* data packet;

(5) transmitting the *first* data packet *or the modified first data packet* from the first bridge computer via the internetwork to the second computer network;

(6) intercepting the *first* data packet *or the modified first data packet* at the second bridge computer;

(7) in the second bridge computer, *if the encapsulation header has been appended to the first data packet,* reading the encapsulation header, and determining therefrom whether the *first* data packet was encrypted, [and if not, proceeding to step 10, and if so, proceeding to step 8] *and if it is determined that the first data packet has been encrypted, proceeding to step 8 and otherwise proceeding to step 10*;

(8) in the second bridge computer, determining which encryption mechanism was used to encrypt the first data packet;

(9) decrypting the first data packet by the second bridge computer;

(10) transmitting the first data packet from the second bridge computer to the second host computer[.]; and

(11) receiving the unencrypted *first* data packet at the second host computer.

2. The method of claim 1, wherein the new address header for the modified *first* data packet includes the internetwork broadcast addresses of the first and second computer networks.

3. The method of claim 2, wherein the new address header for the modified *first* data packet includes an identifier of the second bridge computer.

4. The method of claim 1, wherein the new address header of the modified *first* data packet includes the address of the second host computer.

5. The method of claim 4, wherein the new address header for the modified *first* data packet includes an identifier of the second bridge computer.

6. A system for automatically encrypting and decrypting data packets transmitted from a first host computer on a first computer network to a second host computer on a second computer network, including:

a first bridge computer coupled to the first computer network for intercepting data packets transmitted from said first computer network, the first bridge computer including a first processor and a first memory storing instructions for executing encryption of data packets according to a predetermined encryption/decryption mechanism;

a second bridge computer coupled to the second computer network for intercepting data packets transmitted to said second computer network, the second bridge computer including a second processor and a second memory storing instructions for executing decryption of the data packets;

said first host computer including a third processor and a third memory including instructions for transmitting a first [said] data packet from said first to said second host;

a *first* table stored in said first memory including a correlation of at least one of the first host computer and the first network with one of the second host computer and the second network, respectively;

instructions stored in said first memory for intercepting said first data packet before departure from said first network, determining whether said correlation is present in said *first* table, and if so, then executing encryption of said first data packet according to said predetermined encryption/decryption mechanism, generating a new address header *including a mechanism for identifying said predetermined encryption/decryption mechanism* and appending said new address header to said *encrypted* first data packet, thereby generating a modified first data packet, and transmitting said modified data packet on to the second host computer;

*a second table stored in said second memory including a correlation of at least one of the first host computer and the first network with one of the second host computer and the second network, respectively; and* instruction stored in said second memory for intercepting said *modified* first data packet upon arrival at said second network, determining whether said correlation is present in said *second* table, and if so, then executing decryption of said first data packet according to said predetermined encryption/decryption mechanism, and transmitting the first data packet to the second host computer.

7. [The method of claim 6,] *A system for automatically encrypting and decrypting data packets transmitted from a first host computer on a first computer network to a second host computer on a second computer network, including:*

*a first bridge computer coupled to the first computer network for intercepting data packets transmitted from said first computer network, the first bridge computer*

*including a first processor and a first memory storing instructions for executing encryption of data packets according to a predetermined encryption/decryption mechanism;*

*a second bridge computer coupled to the second computer network for intercepting data packets transmitted to said second computer network, the second bridge computer including a second processor and a second memory storing instructions for executing decryption of the data packets;*

*said first host computer including a third processor and a third memory including instructions for transmitting a first data packet from said first host to said second host;*

*a first table stored in said first memory including a correlation of at least one of the first host computer and the first network with one of the second host computer and the second network, respectively;*

*instructions stored in said first memory for intercepting said first data packet before departure from said first network, determining whether said correlation is present in said first table, and if so, then executing encryption of said first data packet according to said predetermined encryption/decryption mechanism, generating a new address header and appending said new address header to said encrypted first data packet, thereby generating a modified first data packet, and transmitting said modified first data packet on to the second host computer,* wherein said new address header includes [the] internetwork broadcast addresses of the first and second computer networks[.]*;*

*a second table stored in said second memory including a correlation of at least one of the first host computer and the first network with one of the second host computer and the second network, respectively; and*

*instructions stored in said second memory for intercepting said modified first data packet upon arrival at said second network, determining whether said correlation is present in said second table, and if so, then executing decryption of said first data packet according to said predetermined encryption/decryption mechanism, and transmitting the first data packet to the second host computer.*

8. The method of claim 7, wherein said new address header includes an identifier of the second bridge computer.

9. The method of claim 6, wherein said new address header includes the address of the second host computer.

10. The method of claim 9, wherein said new address header includes an identifier of the second bridge computer.

11. A method for transmitting and receiving packets of data via an internetwork from a first host computer on a first computer network to a second host computer on a second computer network, [the first and second computer networks,] each of said first and second host computer networks, each of said first and second host computers including a processor and a memory for storing instructions for execution by the processor, each said memory storing at least [on] *a* predetermined encryption/decryption mechanism and a source/destination table identifying a predetermined plurality of sources and destinations requiring security for packets transmitted between them, the method being [carded] *carried* out by means of the instructions stored in said respective memories and including the steps of:

(1) generating, by the first host computer, a first data packet for transmission to the second host computer, a portion of the *first* data packet including information representing an internetwork address of a source of the *first data* packet and an internetwork address of a destination of the *first data* packet;

(2) in the first host computer, determining whether the source and destination of the first data packet are among the predetermined plurality of sources and destinations identified in said source/destination table for which security is required, and if not, proceeding to step 5, and if so, proceeding to step 3;

(3) encrypting the first data packet in the first host computer;

(4) in the first host computer, generating and appending to the *encrypted* first data packet an encapsulation header, including:

(a) key management information *providing a mechanism for* identifying the predetermined encryption method, and (b) a new address header identifying the source and destination for the *first* data packet, *hereby generating a modified first data packet;*

(5) transmitting the *first* data packet *or the modified first data packet* from the first host computer via the internetwork to the second computer network;

(6) in the second host computer, *if the encapsulation header has been appended to the first data packet,* reading the encapsulation header, and determining therefrom whether the first data packet was encrypted, and if [not] *the first data packet was not encrypted*, ending the method, and if [so] *the first data packet was encrypted*, proceeding to step 7;

(7) in the second host computer, determining which encryption mechanism was used to encrypt the first data packet; and (8) decrypting the first data packet by the second host computer.

12. The method of claim 11, wherein the new address header for the modified *first* data packet includes internetwork broadcast addresses of the first and second computer networks.

13. The method of claim 11, wherein the source/destination table includes data identifying internetwork addresses of the first and second host computers.

14. A system for automatically encrypting and decrypting data packets transmitted from a first host computer on a first computer network [and having a first host computer on a first computer network and], *the first host computer* having *a* first processor and a first memory, via an internetwork to a second host computer on a second computer network [and having a second host computer on a second computer network and], *the second host computer* having a second processor and a second memory, the system including:

security data stored *in* said first and *second* memories indicating that data packets meeting at least one predetermined criterion are to be encrypted;

a predetermined encryption/decryption mechanism stored in said first and second memories;

a decryption key stored in said second memory;

instructions stored in said first memory for determining whether to encrypt *one or more* data packets, by determining whether said *at least one* predetermined criterion is met by said [data packet] *one or more data packets*;

instructions stored in said first memory for executing encryption according to said predetermined encryption/decryption mechanism of at least a first [said data packet] *one of said one or more data packets,* when said

*at least one predetermined* criterion is met, for generating a new address header for said first data packet and for appending an encapsulation header to said first data packet and transmitting said first data packet to said second host, *said new address header identifying broadcast addresses of the first and second computer networks,* said encapsulation header including at least said new address header; *and* instructions stored in said second memory for receiving said first data packet, determining whether it has been encrypted by reference to said security data in said second memory, and if so then determining which encryption/decryption mechanism was used for encryption, and decrypting said *first* data packet by use of said decryption key.

15. The system of claim 14, wherein:

said security data comprises correlation data stored in each of said first and second memories [identifying at least one of said first and second memories] identifying at least one of said first host computer and said first network correlated with at least one of said second host computer and said second network;

the system further including instructions stored in said first memory for determining whether to encrypt data packets by inspecting for a match between source and destination addresses of said data packets with said correlation data.

16. A system for automatically encrypting data packets for transmission from a first host computer on a first computer network to a second host computer on a second computer network, said first host computer including a first processor and a first memory including instructions for transmitting said data packets from said first host to said second host, the system including:

a bridge computer coupled to the first computer network for intercepting at least a first [said] data packet transmitted from said first computer network, said bridge computer including a second processor and a second memory storing instructions for executing encryption of said first data packet according to a predetermined encryption/decryption mechanism;

information stored in said second memory correlating at least one of the first host computer and the first network with one of the second host computer and the second network, respectively; *and* instructions stored in said second memory for intercepting said first data packet before departure from said first network, determining whether said correlation is present, and if so, then executing encryption of said first data packet according to said predetermined encryption/decryption mechanism, generating a new address header *including a mechanism for identifying said predetermined encryption/decryption mechanism* and appending said new address header to said first data packet, thereby generating a modified first data packet on to the second host computer.

17. A method for transmitting packets of data via an internetwork from a first host computer on a first computer network to a second host computer on a second computer network, the first computer networks including a first bridge computer, each of said first and second host computers and said bridge computer further including memory storing at least one predetermined encryption/decryption mechanism and information identifying a predetermined plurality of host computers as hosts requiring security for packets transmitted between them, the method being carried out according to the instructions stored in said respective memories and including the steps of:

(1) generating, by the first host computer, a first data packet for transmission to the second host computer, a portion of the *first* data packet including information representing an internetwork address of the first host computer and an internetwork address of the second host computer;

(2) in the first bridge computer, intercepting the first data packet and determining whether the first and second host computers are among the predetermined plurality of host computers for which security is required, and if not, proceeding to step 5, and if so, proceeding to step 3;

(3) encrypting the first data packet in the first bridge computer;

(4) in the first bridge computer, generating and appending to the first data packet an encapsulation header, including:

(a) key management information *providing a mechanism for* identifying the predetermined encryption method, and (b) a new address header representing the source and destination for the data packet, thereby generating a modified *first* data packet; and (5) transmitting the *first* data packet *or the modified first data packet* from the first bridge computer via the internetwork to the second computer network.

*18. A system for automatically decrypting data packets transmitted from a first computer to a second computer, the system comprising:*

*a bridge coupled to the second computer for intercepting a data packet from the first computer, the data packet having an address header and a body, the address header including broadcast addresses of the first and second computers, the bridge including a processor and a memory that stores instructions for decrypting data packets;*

*information stored in the memory of the bridge correlating the first and second computers; and*

*instructions stored in the memory for intercepting the data packet, determining whether the information stored in the memory of the bridge correlates the first and second computers, and if so, decrypting at least a portion of the data packet to generate a new data packet including a new address header, and transmitting the new data packet onto the second computer.*

*19. The system of claim 18, wherein the data packet includes the new data packet in encrypted form.*

*20. The method of claim 18, wherein the new address header includes information indicating the first computer is a source of the new data packet and the second computer is a destination of the new data packet.*

*21. A system for automatically decrypting data packets transmitted from a first computer to a second computer, the system comprising:*

*a bridge coupled to the second computer for intercepting a data packet from the first computer, the data packet including a header storing key management information providing a mechanism for identifying an encryption method used to encrypt the data packet, the bridge including a processor and a memory that stores instructions for decrypting data packets;*

*information stored in the memory of the bridge correlating the first and second computers; and*

*instructions stored in the memory for intercepting the data packet, determining whether the information stored in the memory of the bridge correlates the first and second computers, and if so, decrypting the data packet to generate a new data packet including a new address header, and transmitting the new data packet onto the second computer.*

*22. A method for receiving data packets from a first computer to a second computer through a bridge including a processor and a memory that stores instructions for decrypting data packets and information correlating the first and second computers, the method being carried out according to instructions in the memory of the bridge and comprising:*

*intercepting a data packet from the first computer to the second computer, the data packet including an address header and a body, the address header including broadcast addresses of the first and second computers and the body including address information representing an internetwork address of the first computer and an internetwork address of the second computer, wherein the address information is encrypted;*

*determining whether the information stored in the memory of the bridge correlates the first and second computers, and if so, decrypting the data packet to generate a new data packet including a new address header; and*

*transmitting the new data packet on to the second computer.*

*23. The method of claim 22, wherein the body includes the new data packet in encrypted form.*

*24. The method of claim 22, wherein the new address header includes information indicating the first computer is a source of the new data packet and the second computer is a destination of the new data packet.*

*25. A method for receiving data packets from a first computer to a second computer through a bridge including a processor and a memory that stores instructions for decrypting data packets and information correlating the first and second computers, the method being carried out according to instructions in the memory of the bridge and comprising:*

*intercepting a data packet from the first computer to the second computer, the data packet including information representing an internetwork address of the first computer and an internetwork address of the second computer;*

*determining whether the information stored in the memory of the bridge correlates the first and second computers, and if so, decrypting the data packet to generate a new data packet including a new address header; and*

*transmitting the new data packet on to the second computer;*

*wherein the data packet includes a header storing key management information providing a mechanism for identifying an encryption method used to encrypt the new data packet.*

*26. A method of encrypting data packets, comprising:*

*receiving a data packet from a source for a destination, the data packet including a header section and a data section, the header section storing a source identifier and a destination identifier;*

*determining whether the data packet should be encrypted upon reference to at least one of the source and destination identifiers;*

*if the data packet should be encrypted, encrypting the data packet to produce an encrypted data packet; and*

*generating a new address header and appending the new address header to the encrypted data packet, thereby generating a modified data packet;*

*wherein the new address header includes a mechanism for identifying an encryption method used to generate the encrypted data packet.*

*27. The method of claim 26, further comprising transmitting the modified data packet to the destination.*

*28. The method of claim 26, wherein the determining whether the data packet should be encrypted comprises accessing stored information that indicates by presence or absence of the source identifier that data packets from the source should be encrypted.*

*29. The method of claim 26, wherein the determining whether the data packet should be encrypted comprises accessing stored information that indicates by presence or absence of a correlation between the source and destination identifiers that data packets from the source for the destination should be encrypted.*

*30. The method of claim 26, wherein the encrypted data packet includes an encrypted data packet header section and an encrypted data packet data section, the encrypted data packet header section including the header section of the data packet after encryption and the encrypted data packet data section including the data section of the data packet after encryption, the modified data packet including a header portion storing the new address header and a data portion storing the encrypted data packet.*

*31. The method of claim 30, wherein the encrypted data packet header section stores the source and destination identifiers.*

*32. The method of claim 26, wherein the source is a host computer or a network.*

*33. The method of claim 26, wherein the destination is a host computer or a network.*

*34. A computer program product adapted for encrypting data packets, comprising:*

*computer code that when executed causes the reception of a data packet from a source for a destination, the data packet including a header section and a data section, and the header section storing a source identifier and a destination identifier;*

*computer code that when executed causes the determination of whether the data packet should be encrypted upon reference to at least one of the source and destination identifiers;*

*computer code that when executed, if the data packet should be encrypted, causes the encryption of the data packet to produce an encrypted data packet;*

*computer code that when executed causes the generation of a new address header and appends the new address header to the encrypted data packet, the new address header including a mechanism for identifying an encryption method used to generate the encrypted data packet, thereby generating a modified data packet; and*

*a computer readable medium that stores the computer codes.*

*35. The computer program product of claim 34, wherein the computer readable medium is a memory, random-access-memory, read-only-memory, disk drive, or CD-ROM.*

*36. A computer system for encrypting data packets, comprising:*

*a processor;*

*a computer readable medium coupled to the processor and storing a computer program comprising:*

*computer code that when executed by the processor causes the processor to receive a data packet from a source for a destination, the data packet including a header section and a data section, and the header section storing a source identifier and a destination identifier;*

*computer code that when executed by the processor causes the processor to determine whether the data packet should be encrypted upon reference to at least one of the source and destination identifiers;*

*computer code that when executed by the processor causes the processor to encrypt the data packet to produce an encrypted data packet when it is determined that the data packet should be encrypted; and*

*computer code that when executed by the processor causes the processor to generate a new address header and append the new address header to the encrypted data packet, thereby generating a modified data packet;*

*wherein the new address header includes a mechanism for identifying an encryption method used to generate the encrypted data packet.*

*37. The computer program product of claim 36, wherein the computer readable medium is a memory, random-access-memory, read-only-memory, disk drive, or CD-ROM.*

*38. A system for automatically encrypting and decrypting data packets transmitted from a first host computer on a first computer network, the first host computer having a first processor and a first memory, via an internetwork to a second host computer on a second computer network, the second host computer having a second processor and a second memory, the system including:*

*security data stored in said first and second memories indicating that data packets meeting at least one predetermined criterion are to be encrypted;*

*instructions stored in said first memory for determining whether to encrypt one or more data packets, by determining whether said at least one predetermined criterion is met by said one or more data packets;*

*instructions stored in said first memory for executing encryption of at least a first one of said one or more data packets according to a predetermined encryption/decryption mechanism, when said at least one predetermined criterion is met, for generating a new address header for said first data packet and for appending an encapsulation header to said first data packet and transmitting said first data packet to said second host, said encapsulation header including said new address header and a mechanism for identifying said predetermined encryption/decryption mechanism;*

*instructions stored in said second memory for receiving said first data packet, determining whether it has been encrypted by reference to said security data in said second memory, and if so then determining which encryption/decryption mechanism was used for encryption, and decrypting said first data packet by use of said encryption/decryption mechanism.*

*39. The system as recited in claim 38, wherein said predetermined encryption/decryption mechanism is provided in encrypted form within said encapsulation header.*

*40. The system of claim 15, wherein said correlation data includes:*

*encryption rules identifying source and destination networks to and from which packets are to be encrypted; and*

*host information indicating exceptions to the encryption rules.*

*41. A system for automatically encrypting data packets for transmission from a first host computer on a first computer network to a second host computer on a second computer network, said first host computer including a first processor and a first memory including instructions for transmitting said data packets from said first host to said second host, the system including:*

*a bridge computer coupled to the first computer network for intercepting at least a first data packet transmitted from said first computer network, said bridge computer including a second processor and a second memory storing instructions for executing encryption of said first data packet according to a predetermined encryption/decryption mechanism;*

*information stored in said second memory correlating at least one of the first host computer and the first network with one of the second host computer and the second network, respectively; and*

*instructions stored in said second memory for intercepting said first data packet before departure from said first network, determining whether said correlation is present, and if so, then executing encryption of said first data packet according to said predetermined encryption/decryption mechanism, generating a new address header including the internetwork broadcast addresses of the first and second computer networks and appending said new address header to said first data packet, thereby generating a modified first data packet on to the second host computer.*

*42. A computer program product adapted for encrypting data packets, comprising:*

*computer code that when executed on a computer causes the computer to receive a data packet from a source for a destination, the data packet including a header section and a data section, and the header section storing a source identifier and a destination identifier;*

*computer code that when executed on a computer causes the computer to determine whether the data packet should be encrypted upon reference to at least one of the source and destination identifiers;*

*computer code that when executed on a computer causes the computer to, if the data packet should be encrypted, encrypt the data packet to produce an encrypted data packet;*

*computer code that when executed on a computer causes the computer to generate a new address header storing at least one of a broadcast address associated with the source and a broadcast address associated with the destination, and append the new address header to the encrypted data packet, thereby generating a modified data packet; and*

*a computer readable medium that stores the computer codes.*

*43. A computer system for encrypting data packets, comprising:*

*a processor;*

*a computer readable medium coupled to the processor storing a computer program comprising:*

*computer code that when executed by the processor causes the processor to receive a data packet from a source for a destination, the data packet including a header section and a data section, the header section storing a source identifier and a destination identifier;*

*computer code that when executed by the processor causes the processor to determine whether the data*

*packet should be encrypted upon reference to at least one of the source and destination identifiers;*

*computer code that when executed by the processor causes the processor to if the data packet should be encrypted, encrypt the data packet to produce an encrypted data packet; and*

*computer code that when executed by the processor causes the processor to generate a new address header storing at least one of a broadcast address associated the source and a broadcast address associated with the destination, and append the new address header to the encrypted data packet, thereby generating a modified data packet.*

*44. The system as recited in claim 16, wherein the mechanism indirectly references said predetermined encryption/decryption mechanism.*

*45. The system as recited in claim 20, wherein the mechanism indirectly identifies the encryption method.*

*46. The method as recited in claim 26, wherein the mechanism indirectly identifies the encryption method.*

*47. The computer program product as recited in claim 34, wherein the mechanism indirectly identifies the encryption method.*

*48. The computer system as recited in claim 36, wherein the mechanism indirectly identifies the encryption method.*

* * * * *